(12) United States Patent
Yanagisawa et al.

(10) Patent No.: US 7,212,927 B2
(45) Date of Patent: May 1, 2007

(54) LOAD-MEASURING DEVICE FOR ROLLING BEARING UNIT AND ROLLING BEARING UNIT FOR LOAD MEASUREMENT

(75) Inventors: Tomoyuki Yanagisawa, Kanagawa (JP); Katsutoshi Matsuoka, Kanagawa (JP); Ikunori Sakatani, Kanagawa (JP); Shin Kumagai, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/545,396

(22) PCT Filed: Feb. 4, 2004

(86) PCT No.: PCT/JP2004/001104

§ 371 (c)(1),
(2), (4) Date: Aug. 12, 2005

(87) PCT Pub. No.: WO2004/072598

PCT Pub. Date: Aug. 26, 2004

(65) Prior Publication Data
US 2006/0155507 A1    Jul. 13, 2006

(30) Foreign Application Priority Data
Feb. 12, 2003  (JP)  ............... 2003-033614
Apr. 24, 2003  (JP)  ............... 2003-120072

(51) Int. Cl.
*G01L 1/00*  (2006.01)
*G01L 3/00*  (2006.01)

(52) U.S. Cl. ............... 702/41; 73/862.541; 73/862.55; 73/562.635

(58) Field of Classification Search ............ 702/41; 73/862.541, 862.55, 862.635
See application file for complete search history.

(56) References Cited

U.S. PATENT DOCUMENTS

| 5,140,849 A | 8/1992 | Fujita et al. |
| 5,952,587 A | 9/1999 | Rhodes et al. |
| 2002/0092360 A1 | 7/2002 | McDearmon |

FOREIGN PATENT DOCUMENTS

| JP | 55-94541 U | 6/1980 |
| JP | 62-218832 A | 9/1987 |
| JP | 3-209016 A | 9/1991 |
| JP | 2913913 B2 | 6/1999 |
| JP | 2002-323056 | * 8/2002 |
| JP | 2002-323056 A | 11/2002 |

* cited by examiner

*Primary Examiner*—Michael Nghiem
*Assistant Examiner*—Sujoy Kundu
(74) *Attorney, Agent, or Firm*—Sughrue Mion, PLLC

(57) ABSTRACT

A revolution speed of balls 8, 8 constituting the outer side row is sensed by a revolution speed sensor 24. Also, a rotation speed of a hub 1a is sensed by a rotation speed sensor 25. A speed ratio as a ratio between a revolution speed and the rotation speed is calculated based on a sensed signal of both sensors 24, 25. When the axial load is changed and then the contact angles of the balls 8, 8 are changed, the revolution speed is changed and in turn the speed ratio is changed. Therefore, the axial load is calculated based on a change of the speed ratio.

Accordingly, the configurations that can be manufactured at a low cost and is able to sense the axial load applied between the hub 1a and the outer ring 4a can be realized.

20 Claims, 5 Drawing Sheets

LOAD-MEASURING DEVICE FOR ROLLING BEARING UNIT AND ROLLING BEARING UNIT FOR LOAD MEASUREMENT

TECHNICAL FIELD

A load measuring unit for a rolling bearing unit and a load measuring rolling bearing unit according to the present invention relates to improvements in the rolling bearing unit used to support a wheel of a mobile body such as a car, a railway vehicle, various carrier cars, or the like, for example, and is utilized to achieve promotion of the running stability of the mobile body by measuring an axial load applied to this rolling bearing unit.

BACKGROUND ART

The wheel of the car, for example, is supported rotatably by the suspension system via the double row angular contact rolling bearing unit. Also, in order to secure the running stability of the car, the vehicle running stabilizing system such as the anti-lock brake system (ABS), the traction control system (TCS), the vehicle stability control system (VSC), or the like is employed. In order to control various vehicle running stabilizing systems, various signals such as a rotation speed of the wheel, accelerations applied to a car body in respective directions, and the like are needed. Then, in order to execute the higher control, in some cases it is preferable to know the magnitude of the axial load applied to the rolling bearing unit via the wheel.

In view of such circumstances, the load measuring unit for the rolling bearing unit shown in FIG. 5 is recited in JP-A-3-209016 (referred to as "Patent Literature 1" hereinafter). First, the configuration of the conventional system will be explained hereunder. A rotary-side flange 2 for supporting the wheel is fixed to an outer peripheral surface of an outer end portion (here, the "outside" in the axial direction denotes the out side in the width direction of the car body in a state assembled to the car, and also corresponds to the left side in FIGS. 1, 2, 5) of a hub 1, which is a rotary ring and also is an inner ring equivalent member. Also, double row inner ring raceways 3, 3 are formed on an outer peripheral surface of a middle portion and an inner end portion (here, the "inside") in the axial direction denotes the middle side in the width direction of the car body when assembled to the car, and also corresponds to the right side in FIGS. 1, 2, 5) of the hub 1.

Meanwhile, a stationary-side flange 6 for supporting/fixing an outer ring 4 onto a knuckle 5, which constitutes the suspension system, is fixed to an outer peripheral surface of the outer ring 4, which is arranged around the hub 1 concentrically with the hub 1 and serves as a stationary ring. Also, double row outer ring raceways 7, 7 are formed on an inner peripheral surface of the outer ring 4. A plurality of balls 8, 8 acting as the rolling elements are provided rotatably between the outer ring raceways 7, 7 and the inner ring raceways 3, 3 respectively, so that the hub 1 is supported rotatably on the inner diameter side of the outer ring 4.

In addition, a load sensor 11 is affixed to plural portions, each of which surrounds a respective threaded hole 10, on the inner surface of the stationary-side flange 6. Bolts 9 for fitting the stationary-side flange 6 to the knuckle 5 are screwed into the threaded holes 10. These load sensors 11 are held between an outer surface of the knuckle 5 and the inner surface of the stationary-side flange 6 so that the outer ring 4 is supported/fixed to the knuckle 5.

In such a load measuring unit as known in the prior art, when the axial load is applied between the wheel (not shown) and the knuckel 5, the outer surface of the knuckle 5 and the inner surface of the stationary-side flange 6 press strongly the load sensors 11 mutually from both sides in the axial direction. Accordingly, the axial load applied between the wheel and the knuckle 5 can be sensed by summing up the measured values of these load sensors 11.

In the case of the conventional configuration shown in FIG. 5, the load sensors 11 must be provided as many as the bolts 9 that support/fix the outer ring 4 to the knuckle 5. As a result of above situation along with the fact that the load sensor 11 itself is expensive, it is unavoidable that a cost of the overall load measuring unit for the rolling bearing unit is considerably increased.

The present invention is made in view of such circumstances to implement such a configuration that can be constructed at a low cost and also can measure an axial load applied to each wheel while keeping an accuracy required for control.

DISCLOSURE OF THE INVENTION

A load measuring unit for a rolling bearing unit of the present invention, comprises a stationary ring not rotated in use; a rotary ring arranged concentrically with the stationary ring, for rotating in use; a plurality of rolling elements provided rollably between a stationary-side raceway and a rotary-side raceway that are formed in mutually opposing positions of the stationary ring and the rotary ring; a revolution speed sensor for sensing a revolution speed of the rolling elements; and a calculator for calculating an axial load applied between the stationary ring and the rotary ring based on a sensed signal fed from the revolution speed sensor.

For example, one raceway ring out of the stationary ring and the rotary ring is an outer ring equivalent member, the other raceway ring is an inner ring equivalent member, and the rolling elements are balls. Then, a contact angle of back-to-back arrangement type is applied to the balls that are provided in plural between double row angular contact inner ring raceways formed on an outer peripheral surface of the inner ring equivalent member and double row angular contact outer ring raceways formed on an inner peripheral surface of the outer ring equivalent member respectively.

Also, the revolution speed of the rolling elements can be measured directly, or the revolution speed of the rolling elements can be measured as a rotation speed of a cage that holds the rolling elements therein.

Also, when the speed of the rotary ring is changed (not constant), a rotation speed sensor for sensing a rotation speed of the rotary ring is further provided, in addition to the revolution speed sensor. Then, the calculator calculates the axial load applied between the stationary ring and the rotary ring, based on a sensed signal fed from the rotation speed sensor and a sensed signal fed from the revolution speed sensor.

When the sensed signal fed from the rotation speed sensor is utilized, preferably the axial load applied between the stationary ring and the rotary ring is calculated based on a speed ratio that is a ratio between a revolution speed of the rolling elements and a rotation speed of the rotary ring.

Also, preferably an acceleration sensor for sensing an acceleration in an axial direction is provided. Then, the calculator calculates the axial load applied between the stationary ring and the rotary ring based on the revolution speed or the speed ratio in a state that the acceleration sensed by the acceleration sensor exceeds the predetermined value with respect to the revolution speed or the speed ratio in a state that the acceleration sensed by the acceleration sensor is below a predetermined value.

In addition, when the rolling bearing unit is used to support a wheel of a car, preferably a steering angle sensor for sensing a value that is proportional to a steering angle applied to a turning wheel of the car, or a torque sensor for sensing a steering force that a driver applies to a steering shaft by turning a steering wheel, is further provided. As this torque sensor, the torque sensor that is built in the (electric or hydraulic) power steering system to reduce a can be used. Also, in case the rolling bearing unit is used in a vehicle such as a car, a railway vehicle, or the like, which changes its route, a yaw rate sensor for sensing a yaw rate (yawing amount, a magnitude of a force applied in a yaw direction, a displacement in the yaw direction, an inclination amount, or the like) applied to a car body of the vehicle is further provided.

Then, the calculator calculates the axial load applied between the stationary ring and the rotary ring based on the revolution speed or the speed ratio in a state that the steering angle sensed by the steering sensor, the steering force sensed by the torque sensor, or the yaw rate sensed by the yaw rate exceeds the predetermined value with respect to the revolution speed or the speed ratio in a state that the steering angle sensed by the steering sensor, the steering force sensed by the torque sensor, or the yaw rate sensed by the yaw rate sensor is below a predetermined value.

Also, a load measuring unit for a rolling bearing unit of the present invention, comprises a stationary ring not rotated in use; a rotary ring arranged concentrically with the stationary ring, for rotating in use; a rolling element provided rollably in plural every row between a stationary-side raceway and a rotary-side raceway that are formed in mutually opposing positions of the stationary ring and the rotary ring in double rows respectively, in a state that directions of contact angles are set oppositely mutually between both rows; a pair of revolution speed sensors for sensing a revolution speed of the rolling elements on both rows; and a calculator for calculating an axial load applied between the stationary ring and the rotary ring, based on a sensed signal fed from the revolution speed sensors.

Then, the calculator calculates the axial load applied between the stationary ring and the rotary ring, based on a difference between the revolution speeds of the rolling elements in both rows.

In addition, preferably a rotation speed sensor for sensing rotation speed of the rotary ring is further provided, and the calculator calculates the axial load applied between the stationary ring and the rotary ring based on a ratio between the rotation speed of the rotary ring, which is derived based on a sensed signal of the rotation speed sensor, and the revolution speeds of the rolling elements in both rows.

The load measuring unit for the rolling bearing unit of the present invention, as constricted above, can sense the axial load applied to this rolling bearing unit by sensing the revolution speed of the rolling elements. That is, the contact angle of the rolling elements (balls) is changed when the rolling bearing unit such as the double row angular contact ball bearing accepts the axial load. As well known in the technical field of the rolling bearing, the revolution speed of the rolling elements are changed when the contact angle is changed. More particularly, with respect to the row on the side that supports the axial load, the contact angle is increased as the axial load is increased. Then, the revolution speed is decelerated when the outer ring equivalent member is the rotary ring, and conversely the revolution speed is accelerated when the inner ring equivalent member is the rotary ring. Therefore, the axial load applied to this rolling bearing unit can be detected by measuring this change of the revolution speed. As the revolution speed sensor for sensing the revolution speed, the inexpensive speed sensor used widely to get the control signal of the ABS or the TCS in the prior art can be employed. For this reason, the overall load measuring unit for the rolling bearing unit can be manufactured inexpensively.

Here, when the rolling bearing unit is used in a state that the rotation speed of the rotary ring is always kept constant, only the revolution speed sensor may be used as the rotation speed sensor to calculate the load. In contrast, when the rotation speed of the rotary ring is changed in use, the axial load can be detected by the rotation speed of the rotary ring sensed by the rotation speed sensor and the revolution speed. In this case, if the speed ratio as the ratio between the revolution speed and the rotation speed is calculated and then the axial load is calculated from this speed ratio, the axial load can be detected exactly even though the rotation speed of the rotary ring is changed.

Also, like the mobile body such as the car, the railway vehicle, when the axial load acts on the rolling bearing unit in the turning movement caused by the route change, a measuring accuracy of the axial load can be improved by sensing the acceleration applied to the mobile body during the turning movement by the acceleration sensor, or sensing the yaw rate applied to the mobile body by the yaw rate sensor. More specifically, the revolution speed (or the speed ratio) in a state that the acceleration sensed by the acceleration sensor or the yaw rate (yawing amount, etc. of the car body) derived from the sensed value by the yaw rate sensor is below a predetermined value is applied as a reference, and then the axial load applied between the stationary ring and the rotary ring is calculated based on the revolution speed (or the speed ratio) in a state that the acceleration sensed by the acceleration sensor or the yaw rate sensed by the yaw rate sensor exceeds a predetermined value. In other words, an amount of change (a difference from the reference condition) from the revolution speed (or the speed ratio) in a state that the acceleration or the yaw rate exceeds the threshold value. Then, the axial load applied due to the route change is detected based on the amount of change. If an amount of change of the revolution speed (or the speed ratio) is calculated in this manner and then the axial value is calculated from this amount of change, precision improvement of the measured value of the axial value can be achieved irrespective of the change of the revolution speed (or the speed ratio).

Further, in the case of the car, precision improvement of the measured value of the axial value can also be achieved by sensing the value, which is proportional to the steering angle applied to the turning wheel of the car, by the steering angle sensor or by sensing the steering force applied to the steering shaft by the torque sensor. More specifically, the revolution speed (or the speed ratio) in a state that the steering angle derived from the sensed value of the steering angle sensor or the steering force derived from the sensed value of the torque sensor (a force applied to turn the steering wheel) is below a predetermined value is used as the reference. Then, the axial load applied between the stationary ring and the rotary ring is calculated based on the revolution speed (or the speed ratio) (at that time) in a state that the steering angle derived from the sensed value of the steering angle sensor or the steering force derived from the sensed value of the torque sensor exceeds a predetermined value. In other words, an amount of change of the revolution speed (or the speed ratio), derived in a state that the steering angle or the steering force exceeds the threshold value, from the revolution speed (or the speed ratio) in the reference state (a difference from the reference state) is calculated, and then the axial load is calculated from this amount of change. In this manner, if an amount of change of the revolution speed (or the speed ratio) is calculated and then the axial load is calculated, precision improvement of the measured value of the axial load can be achieved regardless of the change of the revolution speed (or the speed ratio).

Also, in case the rolling elements are provided rollably between double row stationary raceway ring and stationary raceway ring in a state that the directions of the contact angles are set oppositely mutually between the rows, the rolling element row on the outer side receives particularly the large axial load during the turning movement caused due to the route change and therefore the contact angles are largely changed, so that the revolution speed is varied largely. Then, the axial load can be sensed with better precision by detecting a difference between the revolution speeds in the outer and inner rolling element rows. Further, the axial load in both directions can be sensed.

In above Figures, a reference symbol 1 (1a) denotes a hub, 2 (2a) rotary-side flange, 3 inner ring raceway, 4 (4a) outer ring, 5 (5a) knuckle, 6 (6a) stationary-side flange, 7 outer ring raceway, 8 ball, 9 bolt, 10 threaded hole, 11 load sensor, 12 hub main body, 13 inner ring, 14 spline hole, 15 constant velocity joint, 16 spline shaft, 17 nut, 18 housing, 19 bolt, 20 disk, 21 wheel, 22 stud, 23 nut, 24 revolution speed sensor, 25 rotation speed sensor, 26 fitting hole, 27 cage, 28 encoder, 29 space, and 30 combined sealing ring.

BEST MODE FOR CARRYING OUT THE INVENTION

Figure 1:
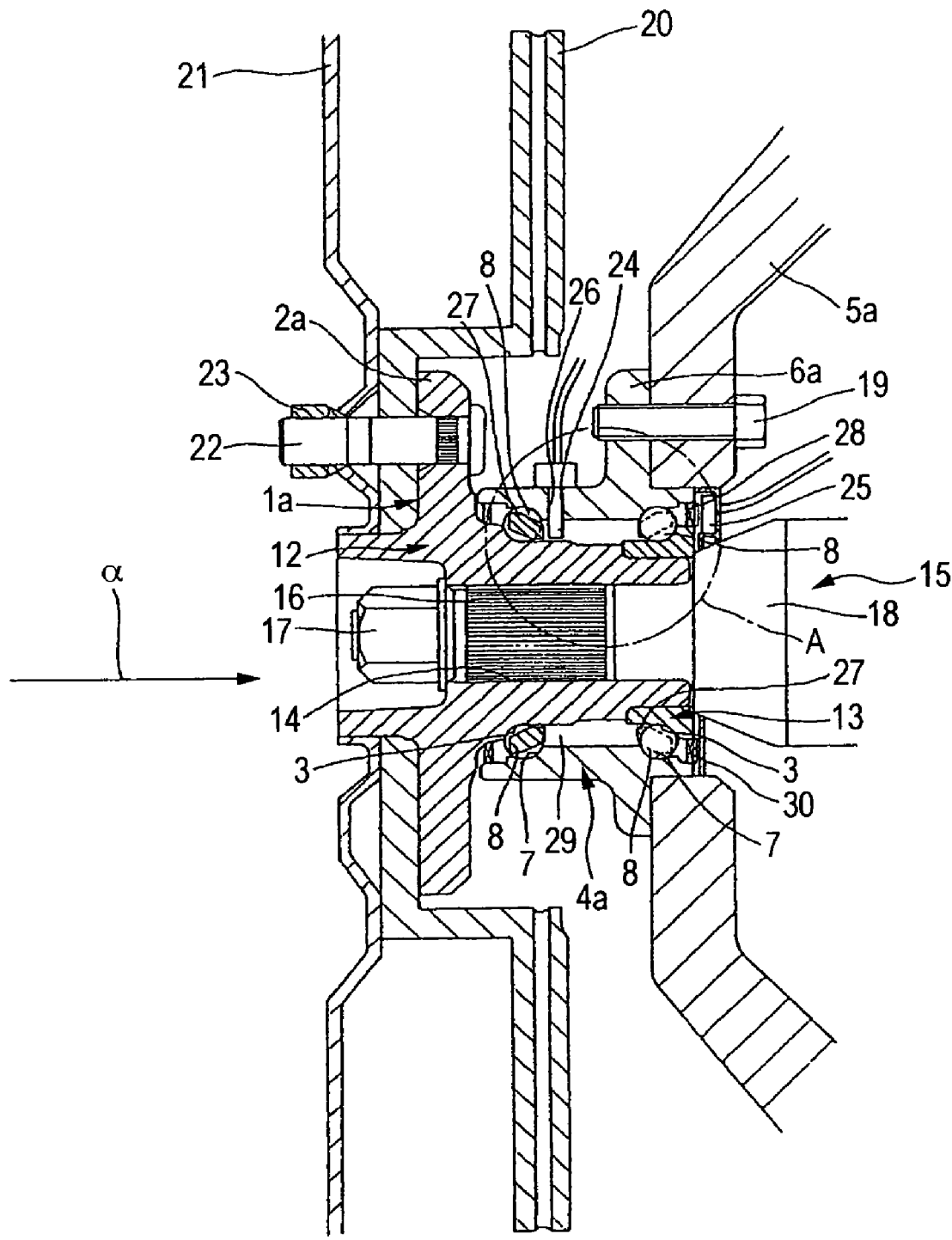
FIG. 1 is a sectional view showing an example of embodiments of the present invention.
Figure 2:
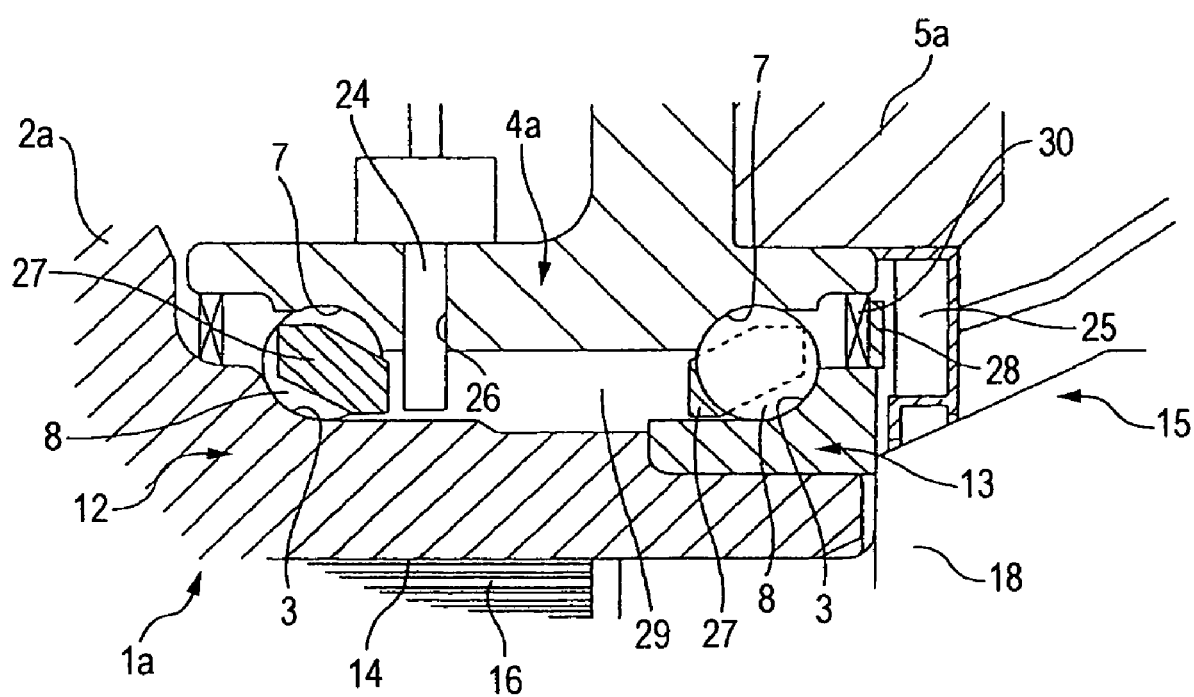
FIG. 2 is an enlarged view of an A portion in FIG. 1.

FIG. 1 and FIG. 2 show an example of embodiments of the present invention. This example shows the case where the present invention is applied to the rolling bearing unit used to support the driving wheel of the car (the rear wheel of the FR car, the RR car and the MD car, the front wheel of the FF car, and all wheels of the 4WD car). A hub 1a serving as the rotary ring and corresponding to the inner ring equivalent member is constructed by fitting/fixing an inner ring 13 onto an inner end portion of a hub main body 12. A rotary-side flange 2a for supporting the wheel is fixed to an outer peripheral surface of the outer end portion of the hub main body 12. Also, the inner ring raceways 3, 3 are formed on the outer peripheral surface of the middle portion of the hub main body 12 and the outer peripheral surface of the inner ring 13 respectively, so that double row angular contact inner ring raceways are provided on the outer peripheral surface of the hub 1a.

Meanwhile, a stationary-side flange 6a for supporting/fixing an outer ring 4a onto a knuckle 5a, which constitutes the suspension system, is fixed to an outer peripheral surface of the outer ring 4a, which is arranged around the hub 1a concentrically with the hub 1a and serves as the stationary ring. Also, the double row outer ring raceways 7, 7 are formed on an inner peripheral surface of the outer ring 4a. Then, a plurality of balls 8, 8 acting as the rolling element respectively are provided rotatably between the outer ring raceways 7, 7 and the inner ring raceways 3, 3 respectively, so that the hub 1a is supported rotatably on the inner diameter side of the outer ring 4a. In this case, respective balls 8, 8 are made of a magnetic metal such as high carbon chromium bearing steels like SUJ2.

In operation of the above rolling bearing unit, a spline shaft 16 attached to a constant velocity joint 15 is inserted into a spline hole 14 formed in the middle portion of the hub main body 12. The hub 1a is held between a nut 17 screwed into the top end portion of the spline shaft 16 and a housing 18 of the constant velocity joint 15 from both sides in the axial direction. Also, the stationary-side flange 6a is supported/fixed to the knuckle 5a by a plurality of bolts 19. Also, a brake disk 20 and a wheel 21 of the wheel are supported/fixed to the rotary-side flange 2a by plural studs 22 and nuts 23.

A revolution speed sensor 24 and a rotation speed sensor 25 are provided to such rolling bearing unit or the knuckle 5a. This revolution speed sensor 24 is used to measure a revolution speed of the balls 8, 8 in the outer row in the axial direction. The revolution speed sensor 24 is fitted into a fitting hole 26. This fitting hole 26 is formed on a part of the outer ring 4a between the double row outer ring raceways 7, 7 to pass through the outer ring 4a in the radial direction. In other words, the revolution speed sensor 24 is provided to pass through this fitting hole 26 from the outside to the inside in the radial direction, and a sensing portion provided to a top end portion of the revolution speed sensor 24 is opposed to the balls 8, 8 in the outer row or a cage 27 that holds these balls 8, 8 therein.

Also, an encoder 28 is fitted/fitted on an outer peripheral surface of the inner end portion of the inner ring 13, and a sensing portion provided to a top end portion of the rotation speed sensor 25 supported to the knuckle 5a is opposed to a sensed surface of the encoder 28. As this encoder 28, various configurations utilized in the prior art to derive control signals in the ABS or the TCS by sensing the rotation speed of the wheel may be employed. For example, the encoder 28 can be affixed to an inner surface of a slinger that constitutes a combined sealing ring 30. This combined sealing ring 30 is used to seal an inner end opening portion of a space 29 in which the balls 8, 8 are provided. As the encoder 28 used in this case, preferably the encoder made of the multipolar magnet, on the inner surface of which the N pole and the S pole are arranged alternately. However, the encoder made simply of magnetic material, or the encoder whose optical characteristics are changed alternately at equal intervals along the circumferential direction (when combined with an optical rotation sensor) may be employed.

Also, as the revolution speed sensor 24 and the rotation speed sensor 25 both being the sensor to sense the rotation speed sensor, the magnetic rotation sensor can be preferably used. Also, as the magnetic rotation sensor, the active rotation sensor into which the magnetic sensing element such as the Hall element, the Hall IC, the magnetoresistive element, the MI element, or the like is incorporated can be preferably used. In constructing the active rotation sensor including such magnetic sensing element, for example, one side surface of the magnetic sensing element is brought into touch with one end surface of a permanent magnet in the magnetizing direction directly or via a stator made of the magnetic material (in the case where the encoder made of the magnetic material is used), and then the other side surface of the magnetic sensing element is opposed to the balls 8, 8 (in the case of the revolution speed sensor 24) or a sensed surface of the encoder 28 (the rotation speed sensor 25) directly or via the stator made of the magnetic material. In case the encoder made of the magnetic material is used, the permanent magnet on the sensor side is not needed.

For example, when the revolution speed sensor 24 used to sense the revolution speed of the balls 8, 8 is constructed as described above, the characteristic of the magnetic sensing element constituting the revolution speed sensor 24 is changed according to the revolution speed of the balls 8, 8. More particularly, an amount of magnetic flux flowing through the magnetic sensing element is increased the moment the ball 8 made of the magnetic material is positioned in close vicinity of the sensed surface of the revolution speed sensor 24, while an amount of magnetic flux flowing through the magnetic sensing element is decreased the moment the sensed surface opposes to the portion between the adjacent balls 8, 8 in the circumferential direction. An amount of magnetic flux flowing through the magnetic sensing element is changed in this manner, and a frequency at which the characteristic of the magnetic sensing element is changed is in proportion to the revolution speed of the balls 8, 8. Therefore, the revolution speed can be derived based on the sensed signal of the revolution speed sensor 24 in which the magnetic sensing element is built. In this case, this sensed signal is fed into a controller in which a calculator (not shown) is built.

In order to sense the revolution speed of the balls 8, 8 based on the above mechanism, these balls 8, 8 should be made of the magnetic material. Accordingly, when the balls made of the nonmagnetic material such as ceramics, or the like are used as these balls 8, 8, it is necessary to use the optical sensor as the revolution speed sensor 24. However, the grease to lubricate the rolling contact portion is often sealed in the space 29 in which the sensing portion of the revolution speed sensor 24 is inserted. In such case, a light reflection cannot be effectively conducted. In light of these circumstances, it is preferable that the balls made of the magnetic material should be used as the balls 8, 8 and also the sensor into which the magnetic sensing element is incorporated should be used as the revolution speed sensor 24.

As described above, in case the revolution speed of the balls 8, 8 is measured directly by the revolution speed sensor 24, it is preferable that the cage made of the nonmagnetic material such as a synthetic resin, or the like should be used as the cage 27 that holds these balls 8, 8 therein. When the cage made of the magnetic material is used, the magnetic flux flowing through between the balls 8, 8 and the sensing portion of the revolution speed sensor 24 is shut off, so that it is impossible to measure the exact revolution speed. Conversely, the revolution speed of the balls 8, 8 can be measured precisely by using the cage 27 made of the nonmagnetic material. Here, the cage 27 may be made of a nonmagnetic metal such as a copper-based alloy, or the like, but it is more preferable that the cage should be made of the synthetic resin because such cage is light in weight and such cage is more hard to shut off the magnetic flux. For instance, because the austenite-based stainless steel that is normally known as the nonmagnetic metal has still a minute magnetism, the cage made of such stainless steel is disadvantageous in an aspect that the revolution speed should be measured exactly.

Also, since the cage 27 is rotated together with the balls 8, 8 according to the revolution of the balls 8, 8, this revolution speed of the balls 8, 8 can be measured as the rotation speed of the cage 27. In case this revolution speed is measured as the rotation speed of the cage 27, the sensing portion of the revolution speed sensor 24 is faced to the sensed portion provided to a part of the cage 27. In this case, when the cage 27 is made of the magnetic material, the sensed portion can be prepared by arranging an unevenness alternately on a part of the cage 27 at an equal interval in the circumferential direction. Also, when the cage 27 is made of the nonmagnetic material such as the synthetic resin, or the like, such structure can be preferably employed that, like the encoder 28, the multipolar magnet on the side surface of which the N pole and the S pole are arranged alternately is affixed to a part of the cage 27.

Also, as the revolution speed sensor 24 and the rotation speed sensor 25, the passive magnetic rotation sensor constructed by winding up a coil around the pole piece made of the magnetic material can be employed. In this case, a voltage of the sensed signal of the passive magnetic rotation sensor is reduced when the rotation speed is lowered. In the case of the load measuring unit for the rolling bearing unit as the object of the present invention, since the principal object is to achieve the running stability during the high-speed running of the mobile body, it is seldom handled as an issue that the voltage of the sensed signal is lowered at the time of low speed rotation. However, if the fulfillment of the high-precision control during the low speed running is also intended, it is preferable to employ the active rotation sensor into which the magnetic sensing element and the permanent magnet, as described above.

Also, in either case the active type or the passive type is as the rotation sensor, it is preferable that sensor constituent parts such as the magnetic sensing element such as the Hall element and the permanent magnet, the pole piece, the coil, etc., except the sensing surface provided to the top end portion, should be molded in the nonmagnetic material such as the synthetic resin, or the like. The rotation sensor constructed by molding the sensor constituent parts in the synthetic resin in this manner is opposed to the sensed portion, i.e., the balls 8, 8 or the cage 27 in the case of the revolution speed sensor 24 or the encoder 28 in the case of the rotation speed sensor 25. In the illustrated example, the revolution speed sensor 24 is opposed to the balls 8, 8 in the outer side or the cage 27 holding these balls 8, 8 therein to sense the revolution speed of the balls 8, 8. Also, in the illustrated example, the revolution speed sensor 24 is opposed to the balls 8, 8 or the cage 27 in the axial direction, but such revolution speed sensor 24 can be positioned in the radial direction within a limit in which the interference between such sensor and the rolling contact portions of the balls 8, 8 on the outer ring raceway 7 can be prevented.

The load measuring unit for the rolling bearing unit of the present invention constructed as above can sense the axial load, which acts between the wheel 21 constituting the wheel and the knuckle 5a and is applied to the rolling bearing unit, by sensing the revolution speed of the balls 8, 8 directly or via the cage 27. That is, when the axial load is loaded onto the rolling bearing unit as the double row angular contact ball bearing, a contact angle of the balls 8, 8 is changed. For example, as indicated with an arrow α in FIG. 1, when the axial load is applied inwardly, the contact angle of the balls 8, 8 on the outer side (the left side in FIG.

1) is increased. As well known in the technical field of the rolling bearing, the revolution speed of the balls 8, 8 constituting the angular contact ball bearing is changed when the contact angle of the balls 8, 8 is changed. More specifically, in the outer row that supports the axial load, the revolution speed of the balls 8, 8 is accelerated as the axial load is increased. Therefore, the axial load applied to the rolling bearing unit can be sensed if a change of the revolution speed is measured.

Figure 3:
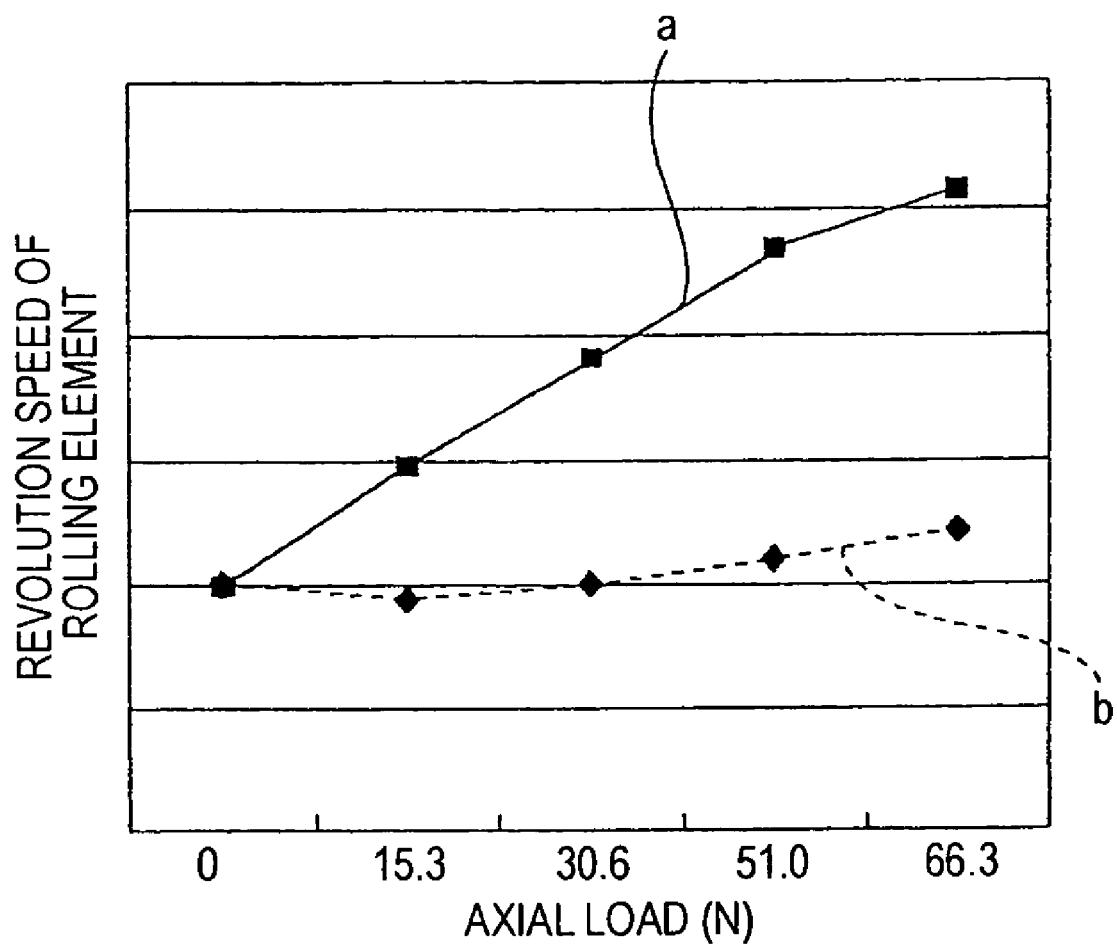
FIG. 3 is a diagram showing a relationship between an axial load and a revolution speed of each rolling element.

For example, FIG. 3 shows a relationship between a magnitude of the axial load and the revolution speed of the balls 8, 8 in the case where the axial load is applied to the back-to-back arrangement type double row rolling bearing unit, which has the configuration shown in FIGS. 1 and 2, in the direction indicated with the arrow α. A solid line a in FIG. 3 denotes a relationship between the axial load and the revolution speed of the balls 8, 8 in the outer row (the left side in FIG. 1), and a broken line b denotes a relationship between the axial load and the revolution speed of the balls 8, 8 in the inner row. Where the radial load is set constant. As apparent from such FIG. 3, with regard to the balls 8, 8 in the row on the side that receives the axial load, the magnitude of the axial load and the revolution speed of the balls 8, 8 have an almost proportional relation. Therefore, the axial load acting on the double row rolling bearing unit can be calculated by measuring the revolution speed of the balls 8, 8. Also, as the revolution speed sensor 24 used to measure the revolution speed, the inexpensive speed sensor, which is widely used to get the control signal in the ABS or the TCS in the prior art, can be employed. For this reason, the unit for measuring the axial load applied to the double row rolling bearing unit can be constructed inexpensively. It is preferable that the relationship used to detect the axial load and indicated by the solid line a in FIG. 3 should be detected previously experimentally or by a calculation and then input into a calculator that is used to calculate the axial load.

Here, such a situation may be considered that, in case the vehicle, e.g., various carrier cars used in the factory, moves at a constant speed, the rolling bearing unit is used in a state that the rotation speed of the rotary ring is always kept constant. In such case, as the rotation sensor used to calculate the axial load, it is enough to provide only the revolution speed sensor 24. On the contrary, like the illustrated example, in the case of the double row rolling bearing unit used to support the wheel of the car, the rotation speed of the hub 1a as the rotary ring is changed in use. Therefore, in the illustrated example, the rotation speed sensor 25 in addition to the revolution speed sensor 24 is provided to sense the rotation speed of the hub 1a. Then, the axial load is calculated based on the rotation speed of the hub 1a sensed by the rotation speed sensor 25 and the revolution speed of the balls 8, 8 sensed by the revolution speed sensor 24.

The calculator built in the controller (not shown) first calculates a speed ratio of the revolution speed to the rotation speed (=the revolution speed of the balls 8, 8/the rotation speed of the hub 1a), based on a signal representing the revolution speed, which is fed from the revolution speed sensor 24, and a signal representing the rotation speed of the hub 1a, which is fed from the rotation speed sensor 25. Then, a change of the revolution speed of the balls 8, 8 is calculated based on a change of the speed ratio. In this fashion, if a change of the revolution speed is calculated based on the speed ratio and then the axial load applied to the double row rolling bearing unit is calculated based on this change of the revolution speed, the axial load can be calculated exactly even though the rotation speed of the hub 1a is changed. Here, it is preferable that a relationship between the speed ratio and the axial load should be derived previously experimentally or by a calculation and should be input into the calculator used to calculate the axial load.

Also, in case the present invention is embodied by the rolling bearing unit that is used to support the wheel of the mobile body such as the car, the railway vehicle, or the like, it is preferable that an acceleration sensor (not shown) should be provided separately and then an acceleration generated based on a centrifugal force at the time of changing the route (at the time of turning) should be sensed by this acceleration sensor. In detail, in the case of the mobile body such as the car, the railway vehicle, or the like, merely the radial load acts on the rolling bearing unit at the time of straight running except special situations such as the running in a strong wind, the running on an inclined plane, or the like, but the axial load except a preload seldom acts on such bearing unit. In contrast, when the mobile body changes its route, a lateral force acts on this mobile body based on a centrifugal force, and then the axial load acts on the rolling bearing unit based on this force. Accordingly, the axial load hardly acts on the rolling bearing unit when a measured value of the acceleration sensor is substantially zero, while the axial load acting on the rolling bearing unit is increased when a measured value of the acceleration sensor is large.

Figure 4:
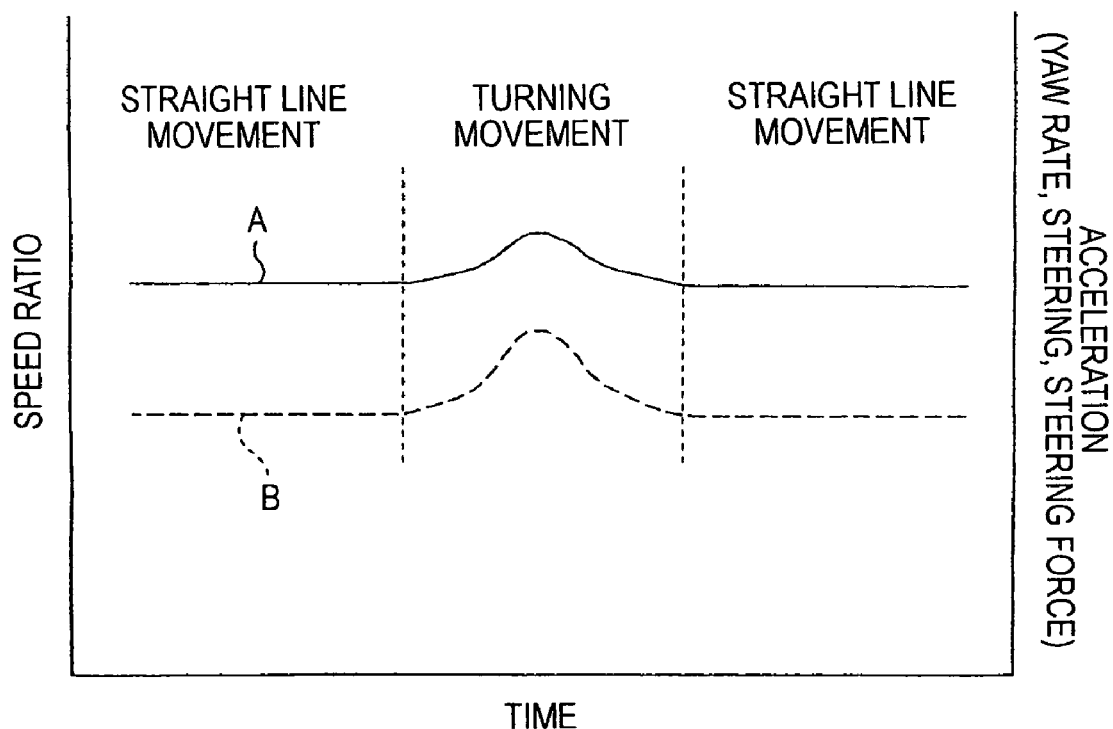
FIG. 4 is a diagram showing a relationship between a speed ratio between a rotation speed of a rotary ring and a revolution speed of respective rolling elements and an acceleration (yaw rate, steering, steering effect)
Figure 5:
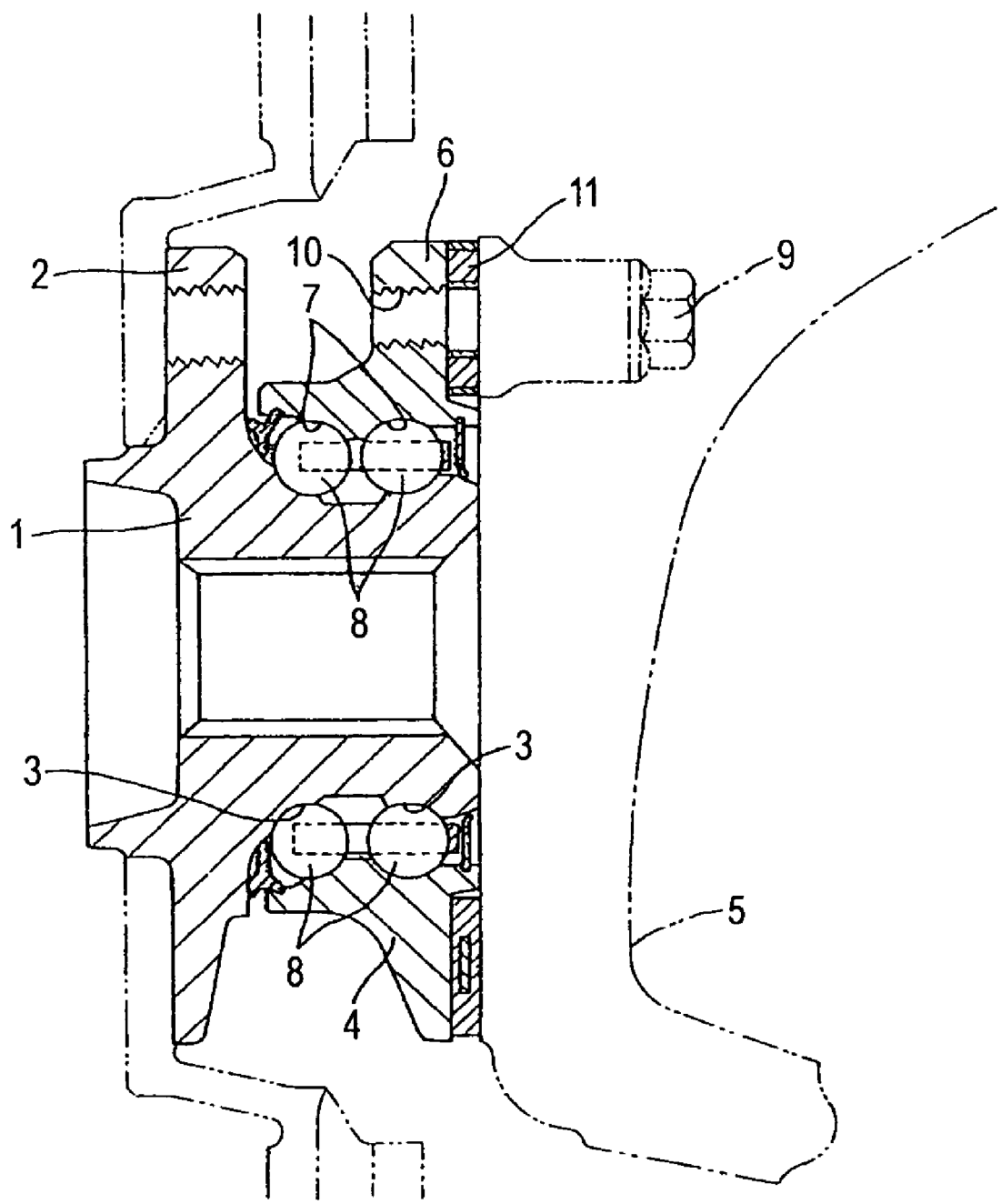
FIG. 5 is a sectional view showing an example of the conventional configurations.

FIG. 4 shows a relationship between the speed ratio and the measured value of the acceleration sensor. A solid line A in FIG. 4 denotes a relationship between the speed ratio and a time, and a broken line B denotes a relationship between the measured value of the acceleration sensor and a time. Also, FIG. 4 shows the situation that the mobile body that is running straightly changes its route and then such mobile body returns to the straight running once again. As apparent from such FIG. 4, the speed ratio changes in proportion to the measured value of acceleration sensor. If the acceleration generated based on the centrifugal force is measured by utilizing such relationship and then the axial load is calculated on the basis of the speed ratio obtained when this acceleration is less than a certain value, the axial load can be derived more precisely. In other words, it may be considered that the axial load is almost zero in a condition that the acceleration is less than a certain value (almost zero). Therefore, the speed ratio in this condition is supposed as the speed ratio obtained when the axial load is zero (reference speed ratio). Then, a difference between the speed ratio and the reference speed ratio is calculated at that time when the acceleration is in excess of the certain value and then the axial load is calculated based on this difference (under the assumption that the axial load that is proportional to the difference is acting), the acceleration can be derived with better precision. If the axial load must be derived precisely even under the special condition such as the running in a strong wind, the running on an inclined plane, or the like, such axial load is corrected by using measured values of a side wind speed indicator, a clinometer, etc. provided separately.

Here, in case the acceleration sensor is provided, a magnitude of the centrifugal force acting the overall mobile body can be calculated by multiplying the acceleration sensed by the acceleration sensor by a mass of the mobile body. However, it is impossible to sense a magnitude of the axial load acting on the individual unit of a plurality of rolling bearing units that support this mobile body. In contrast, according to the load measuring unit for the rolling bearing unit of the present invention, the magnitude of the axial load acting on the individual unit of the rolling bearing units can be sensed. For this reason, this load measuring unit for the rolling bearing unit makes it possible to execute the control that is applied to ensure the running stability of the mobile body such as the car, the railway vehicle, or the like. Here, when the acceleration sensor is to be provided, such sensor may be built in the rolling bearing unit or such sensor may be incorporated into the interior of the mobile body such as the car, the railway vehicle, or the like. Also, either one or plural acceleration sensors may be provided.

In the case of the car, the railway vehicle, or the like, the acceleration sensor fitted in the car body may be utilized as the acceleration sensor. Also, in the case of the car, the railway vehicle, or the like, a signal of a yaw rate sensor used to sense the yawing (jolt in the lateral direction) of the car body may be utilized in place of the acceleration sensor. That is, since a yaw rate is substantially proportional to the acceleration in the axial direction, the axial load can be derived exactly by using the yaw rate, as in the case where the sensed signal of the acceleration sensor is utilized.

As described above, in the case of the mobile body including the railway vehicle, the acceleration sensor (or the yaw rate sensor) is used to sense whether or not the route change has been done (whether such mobile body is in a straight line movement condition or a turning movement condition). If the mobile body is restricted to the car, a steering sensor or a torque sensor for the power steering can be used instead of the acceleration sensor. For example, when the steering angle applied to the turning wheel (normally the front wheel except the special purpose vehicle such as the fork lift) of the car is changed as indicated by the broken line ⊏ in FIG. 4, the speed ratio is changed as indicated by the solid line ⊀ in FIG. 4. That is, a relationship between the steering angle and the speed ratio almost coincides with the relationship between the acceleration and the speed ratio described above.

Therefore, even when the steering angle sensor is provided in lieu of the acceleration sensor (or the raw rate sensor) and then the sensed signal of the steering angle sensor is utilized, the similar effect to the case where the acceleration sensor (or the raw rate sensor) is utilized can be achieved. More particularly, the steering angle applied to the turning wheel is measured by the steering angle sensor, then the axial load is calculated on the basis of the speed ratio obtained when this steering angle is less than a certain value (substantially zero), and then the speed ratio in this condition is assumed as the speed ratio obtained when the axial load is zero (reference speed ratio). Then, when the steering angle exceeds the certain value (the steering angle is substantially applied), a difference between the speed ratio and the reference speed ratio at that point of time is calculated and then the axial load is calculated based on this difference. Thus, the axial load can also be sensed with good precision.

Also, it can be decided whether or not the steering angle is applied to the turning wheel, based on the sensed signal of the torque sensor that is built in the (electric or hydraulic) power steering used to reduce a force (steering force) required to turn the steering wheel. More particularly, the steering wheel is not turned in the straight line running condition during which no steering angle is applied to the turning wheel, and the torque is never applied to the steering shaft. Thus, the sensed signal of the torque sensor becomes substantially zero. In contrast, the steering wheel is turned in the turning running condition during which the steering angle is applied to the turning wheel, and the torque is applied to the steering shaft. Thus, the speed ratio obtained when the axial load applied to the rolling bearing unit is zero (reference speed ratio), which was obtained by the accel-eration sensor (or the raw rate sensor) or the steering angle sensor, can also be obtained by the sensed signal of the torque sensor. Then, when the torque sensor senses the torque after the reference speed ratio is calculated, the axial load is calculated based on the speed ratio at that point of time.

The sensed values of the acceleration sensor, the steering angle sensor, the torque sensor, and the yaw rate sensor utilized to improve a measuring precision of the axial load, as described above, can be utilized solely or in combination respectively. That is, a compared value is calculated by comparing the sensed values of two sensors or more selected from the above sensors mutually, and then the revolution speed or the speed ratio in a condition that the resultant compared value is below a predetermined value is set as a reference value. Then, when the compared value exceeds the predetermined value, a difference between the revolution speed or the speed ratio in that condition and the reference value is calculated, and the axial load is calculated based on this difference. Thus, a measuring precision of the axial load can be improved.

In the illustrated example, such an example is shown that the revolution speed sensor 24 is provided only to the balls 8, 8 side in the outer side row whose contact angle is largely changed to generate a large variation of the revolution speed since such balls receive the particularly large axial load during the turning running caused by the route change. On the contrary, if the revolution speed sensor 24 is also provided to the balls 8, 8 side in the inner side row to sense a difference between the revolution speeds of the balls 8, 8 in both the outer and inner side rows, the axial load can be detected with better precision. In addition, the axial load acting in the opposite direction (outwardly) to the illustrated example can also be detected.

Also, the signal representing the revolution speed of the balls 8, 8, that the revolution speed sensor 24 senses, and the signal representing the rotation speed of the hub 1a, that the rotation speed sensor 25 senses, may be processed by a hardware such as an analogue circuit, or the like or may be processed based on a software by using a microcomputer, or the like.

Also, in the illustrated example, the case where the present invention is applied to the double row angular contact rolling bearing unit used to support the wheel of the car is shown. But the present invention can also be applied to the normal single row deep groove ball bearing or the tapered roller bearing. Also, the present invention can be applied to the bearing unit in which the normal single row rolling bearings, in addition to the duplex rolling bearing. Also, when the present invention is to be applied to the double row angular contact rolling bearing unit used to support the wheel of the car, the present invention can be applied to the so-called third-generation hub unit, in which the inner ring raceway on the outer side is formed on the outer peripheral surface of the middle portion of the hub main body, as shown in FIG. 1. In other words, the present invention can also be applied to the so-called second-generation hub unit, in which a pair of inner rings are fitted/fixed onto the middle portion to the inner end portion of the hub main body, and the so-called first-generation hub unit, in which a pair of inner rings are fitted/fixed onto the middle portion to the inner end portion of the hub main body and also the outer ring whose outer peripheral surface is formed as a simple cylindrical shape is fitted/supported into the supporting hole of the knuckle. Alternately, the present invention can also be applied to the structure in which a pair of rolling bearings constructed as the single row type respectively are provided between the outer peripheral surface of the middle portion to the inner end portion of the hub main body and the inner peripheral surface of the supporting hole of the knuckle.

In addition, it may be considered that the revolution speed of respective rolling elements and the speed ratio in the condition that the axial load is zero are different owing to a variation in a machining accuracy (a variation in an initial contact angle) of individual rolling bearing units. Further, there is a possibility that the revolution speed and the speed ratio in the condition that the axial load is zero are changed owing to a minute deformation in respective portions dependent on the use. Therefore, if the speed ratio in the condition that the axial load is zero, which is decided as described above (based on the signals of the acceleration sensor, the steering angle sensor, the torque sensor, the yaw rate sensor, etc.), is stored in the controller as the initial set value, and then such speed ratio is learned (updated) continuously, it can be continued from the first until a long term has elapsed that the axial load is detected precisely.

The present invention is explained in detail with reference to particular embodiments, but it is apparent for the person skilled in the art that various variations and modifications can be applied without departing a spirit and a scope of the present invention.

This application was filed based on Japanese Patent Application (Patent Application No.2003-33614) filed on Feb. 12, 2003 and Japanese Patent Application (Patent Application No.2003-120072) filed on Apr. 24, 2003, and the contents thereof are incorporated herein by the reference.

INDUSTRIAL APPLICABILITY

As described above, the load measuring unit for the rolling bearing unit and the load measuring rolling bearing unit according to the present invention are valuable for the rolling bearing unit used to support the wheel of the mobile body such as the car, the railway vehicle, various carrier cars, or the like, for example.

The invention claimed is:

1. A load measuring unit for a rolling bearing unit, comprising:
   a stationary ring not rotated in use;
   a rotary ring arranged concentrically with the stationary ring, for rotating in use;
   a plurality of rolling elements provided rollably between a stationary-side raceway and a rotary-side raceway that are formed in mutually opposing positions of the stationary ring and the rotary ring;
   a revolution speed sensor for sensing a revolution speed of the rolling elements; and
   a calculator for calculating an axial load applied between the stationary ring and the rotary ring based on a sensed signal fed from the revolution speed sensor.

2. A load measuring unit for a rolling bearing unit, according to claim 1, wherein one raceway ring out of the stationary ring and the rotary ring is an outer ring equivalent member, the other raceway ring is an inner ring equivalent member, the rolling elements are balls, and a contact angle of back-to-back arrangement type is applied to the balls that are provided between double row angular contact inner ring raceways formed on an outer peripheral surface of the inner ring equivalent member and double row angular contact outer ring raceways formed on an inner peripheral surface of the outer ring equivalent member respectively.

3. A load measuring unit for a rolling bearing unit, according to claim 1, wherein the revolution speed of the rolling elements is measured directly.

4. A load measuring unit for a rolling bearing unit, according to claim 1, wherein the revolution speed of the rolling elements is measured by measuring a rotation speed of a cage that holds the rolling elements therein.

5. A load measuring unit for a rolling bearing unit, according to claim 1, further comprising:
   a rotation speed sensor for sensing a rotation speed of the rotary ring; wherein the calculator calculates the axial load applied between the stationary ring and the rotary ring based on a sensed signal fed from the rotation speed sensor and a sensed signal fed from the revolution speed sensor.

6. A load measuring unit for a rolling bearing unit, according to claim 5, wherein the axial load applied between the stationary ring and the rotary ring is calculated based on a speed ratio that is a ratio between the revolution speed of the rolling elements and the rotation speed of the rotary ring.

7. A load measuring unit for a rolling bearing unit, according to claim 1, further comprising:
   an acceleration sensor for sensing an acceleration in an axial direction;
   wherein the calculator calculates the axial load applied between the stationary ring and the rotary ring based on the revolution speed or the speed ratio when the acceleration sensed by the acceleration sensor exceeds a predetermined value with respect to the revolution speed, or based on the speed ratio when the acceleration sensed by the acceleration sensor is below a predetermined value.

8. A load measuring unit for a rolling bearing unit, according to claim 7, wherein the acceleration sensor is fitted to a portion except constituent members of the rolling bearing unit.

9. A load measuring unit for a rolling bearing unit, according to claim 7, wherein the acceleration sensor is fitted to the constituent members of the rolling bearing unit.

10. A load measuring unit for a rolling bearing unit, according to claim 1, wherein the rolling bearing unit is used to support a wheel of a car, and
    further comprising:
    a steering angle sensor for sensing a value that is proportional to a steering angle applied to a turning wheel of the car;
    wherein the calculator calculates the axial load applied between the stationary ring and the rotary ring based on the revolution speed or the speed ratio when the steering angle sensed by the steering angle sensor exceeds a predetermined value with respect to the revolution speed, or based on the speed ratio when the steering angle sensed by the steering angle sensor is below a predetermined value.

11. A load measuring unit for a rolling bearing unit, according to claim 1, wherein the rolling bearing unit is used to support a wheel of a car, and
    further comprising:
    a torque sensor for sensing a steering force that a driver applies to a steering shaft by turning a steering wheel;
    wherein the calculator calculates the axial load applied between the stationary ring and the rotary ring based on the revolution speed or the speed ratio when the steering force sensed by the torque sensor exceeds a predetermined value with respect to the revolution speed, or based on the speed ratio when the steering force sensed by the torque sensor is below a predetermined value.

12. A load measuring unit for a rolling bearing unit, according to claim 1, wherein the rolling bearing unit is used to support a wheel of a vehicle, and
further comprising:
a yaw rate sensor for sensing a yaw rate applied to a car body of the vehicle;
wherein the calculator calculates the axial load applied between the stationary ring and the rotary ring based on the revolution speed or the speed ratio when the yaw rate sensed by the yaw rate exceeds a predetermined value with respect to the revolution speed, or based on the speed ratio when the yaw rate sensed by the yaw rate sensor is below a predetermined value.

13. A load measuring unit for a rolling bearing unit, according to claim 12, wherein the yaw rate sensor is fitted to a portion except constituent members of the rolling bearing unit.

14. A load measuring unit for a rolling bearing unit, according to claim 12, wherein the yaw rate sensor is fitted to the constituent members of the rolling bearing unit.

15. A load measuring unit for a rolling bearing unit, according to claim 1, wherein the rolling bearing unit is used to support the wheel of the car, and
further comprising:
a steering angle sensor sensing a value that is proportional to a steering angle applied to a turning wheel of the car; and
an acceleration sensor for sensing an acceleration in an axial direction;
wherein the calculator compares the acceleration sensed by the acceleration sensor in the axial direction with the steering angle sensed by the steering angle sensor, and then calculates the axial load applied between the stationary ring and the rotary ring based on the revolution speed or the speed ratio when a resultant compared value exceeds a predetermined value.

16. A load measuring unit for a rolling bearing unit, according to claim 1, wherein the rolling bearing unit is used to support the wheel of the car, and
further comprising:
a torque sensor for sensing a steering force that a driver applies to a steering shaft by turning a steering wheel; and
an acceleration sensor for sensing an acceleration in an axial direction;
wherein the calculator compares the acceleration sensed by the acceleration sensor in the axial direction with the steering force sensed by the torque sensor, and then calculates the axial load applied between the stationary ring and the rotary ring based on the revolution speed or the speed ratio when a resultant compared value exceeds a predetermined value.

17. A load measuring unit for a rolling bearing unit, comprising:
a stationary ring not rotated in use;
a rotary ring arranged concentrically with the stationary ring, for rotating in use;
rolling elements provided rollably between a stationary-side raceway and a rotary-side raceway that are formed in mutually opposing positions of the stationary ring and the rotary ring in double rows, wherein directions of contact angles are set mutually opposite between both rows;
a pair of revolution speed sensors for sensing a revolution speed of the rolling elements on both rows; and
a calculator for calculating an axial load applied between the stationary ring and the rotary ring, based on a sensed signal fed from the revolution speed sensors.

18. A load measuring unit for a rolling bearing unit, according to claim 17, wherein the calculator calculates the axial load applied between the stationary ring and the rotary ring, based on a difference between the revolution speeds of the rolling elements in both rows.

19. A load measuring unit for a rolling bearing unit, according to claim 18, further comprising:
a rotation speed sensor for sensing rotation speed of the rotary ring;
wherein the calculator calculates the axial load applied between the stationary ring and the rotary ring based on a ratio between the rotation speed of the rotary ring, which is derived based on a sensed signal of the rotation speed sensor, and the difference between the revolution speeds of the rolling elements in both rows.

20. A load measuring unit for a rolling bearing unit, according to claim 11, wherein the rolling bearing unit is used to support the wheel of the car, and
further comprising:
a torque sensor for sensing a steering force that a driver applies to a steering shaft by turning a steering wheel; and
an acceleration sensor for sensing an acceleration in an axial direction;
wherein the calculator compares the acceleration sensed by the acceleration sensor in the axial direction with the steering force sensed by the torque sensor, and then calculates the axial load applied between the stationary ring and the rotary ring based on the revolution speed or the speed ratio when a resultant compared value exceeds a predetermined value.

* * * * *